United States Patent Office 3,600,339
Patented Aug. 17, 1971

---

3,600,339
POLYURETHANE FOAMS FROM HYDROXY PHOSPHONATES
Charles F. Baranauckas and Irving Gordon, Niagara Falls, N.Y., assignors to Hooker Chemical Corporation, Niagara Falls, N.Y.
No Drawing. Division of application Ser. No. 678,157, Oct. 23, 1967, now Patent No. 3,515,776, which is a continuation of application Ser. No. 348,252, Feb. 28, 1964. This application Jan. 3, 1969, Ser. No. 803,513
Int. Cl. C08g 22/44
U.S. Cl. 260—2.5                                       20 Claims

ABSTRACT OF THE DISCLOSURE

Polyurethane foams are made flame retardant by including hydroxy-containing phosphonates in the reaction mixture.

---

This is a division of copending parent application S.N. 678,157 (now U.S. Pat. No. 3,515,776) which was filed Oct. 23, 1967; S.N. 678,157 is a streamline continuation of S.N. 348,252, filed Feb. 28, 1964, and now abandoned.

This invention relates to novel phosphonate mixtures. More particularly, it relates to mixtures of cyclic and non-cyclic phosphonates, methods for the preparation thereof, products containing said phosphonates, and uses thereof.

In accordance with the present invention, a composition comprising a mixture of bicyclic, cyclic and non-cyclic phosphonates has been prepared, said phosphonates having the structural formulae:

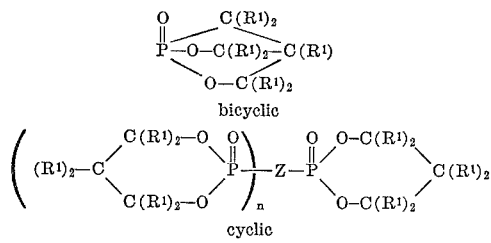

bicyclic cyclic and

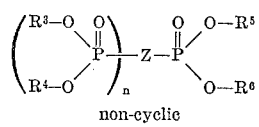

non-cyclic wherein $R^3$, $R^4$, $R^5$ and $R^6$ are selected from the groups consisting of alkyl, aryl, alkenyl, aryl substituted alkyl, alkyl substituted aryl, substituted aryl, nitroalkyl, substituted alkyl, heterocyclic, hydroxy alkyl, alkoxy alkyl, hydroxy alkoxy alkyl, substituted alkenyl, hydroxy polyalkoxy alkyl, and mixtures thereof; $R^1$ is selected from the group consisting of hydrogen and $R^3$, $R^4$, $R^5$ and $R^6$; Z is selected from the group consisting of alkyl, alkylene, alkenyl, aryl, aralkyl, nitroalkyl, substituted aryl, substituted alkyl, substituted alkylene, substituted alkenyl, hydroxy aryl, hydroxy alkyl, alkoxy alkyl, hydroxy alkoxy alkyl; n is from 0 to 5, and each cyclic and bicyclic phosphonate has from 1 to 32 hydroxyls, each noncyclic has from 3 to 32 hydroxyls; and polymers thereof.

The novel mixture of bicyclic, cyclic and non-cyclic phosphonates (esters of phosphonic acid) of this invention have surprisingly been found to have hydroxyl numbers that make them particularly useful phosphorus-containing chemicals with the ability to readily undergo reactions with other poly-functional intermediates and give unexpected, superior results over either of the bicyclic, cyclic and non-cyclic phosphonates individually. They react with polyisocyanates, e.g., toluene diisocyanate or polymethylene polyphenyl isocyanate, to form foamed polyurethanes which are flame resistant and have improved heat distortion temperatures. In addition, the free hydroxy groups in the phosphonate mixture of this invention may be reacted with polybasic acids and anhydrides, e.g., isophthalic acid, fumaric acid, maleic anhydride, and so forth, to form resinous polyester compositions that are flame resistant. The novel mixtures of cyclic and non-cyclic phosphonates are also resistant to hydrolytic attack. Further, they are useful for reactions with alkyd resins used to make film-forming products. The phosphonate mixtures of this invention improve the burning resistance of such alkyd resins. The mixed phosphonate compositions of the invention are particularly useful in polyolefins, e.g., polypropylene and polyethylene, to improve the dyeing characteristics of fabrics produced. This occurs, it is believed, as the novel mixtures of this invention are surprisingly stable and are not subject to loss by evaporation, hydrolysis or leaching.

The novel mixtures of bicyclic, cyclic and non-cyclic esters of phosphonic acid may be prepared in a variety of ways. They may be prepared by reacting a triorgano phosphite with an excess of a polyhydric compound having the formula $R^7(OH)m$ where $R^7$ is selected from the group consisting of alkyl, aryl, substituted alkyl, said substituent, if any, being inert under conditions of reaction, substituted aryl, said substituent, if any, being inert under conditions of reaction, alkenyl, substituted alkenyl, said substituent, if any, being inert under conditions of reaction, heterocyclic, substituted heterocyclic, said substituent, if any, being inert under conditions of reaction, and mixtures thereof; and m is from 2 to 33, to form an intermediate novel mixture of cyclic and non-cyclic esters of phosphorous acid and rearranging the tertiary esters of phosphorous acid by heat, or a stoichiometric, or a catalytic, or excess of stoichiometric amount of Arbuzov reagent, to a mixture of bicyclic, and/or cyclic, and/or non-cyclic esters of phosphonic acid.

The mixtures of phosphonates of this invention may be prepared in a variety of ways. By reacting one mole of a triaryl phosphite with an excess of one mole, but less than two moles, of a polyhydric compound, a mixed composition results in which bicyclic and cyclic phosphites predominate. That is, from 55 to 95 percent of such a mixture is a cyclic and/or bicyclic mixture. The mixed phosphite composition may then be rearranged by utilizing a catalytic, stoichiometric, or excess amount of an Arbuzov reagent. When a catalytic amount of an Arbuzov reagent is utilized, a composition is formed comprising predominately a mixture of phosphonates having the formulae:

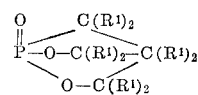

and

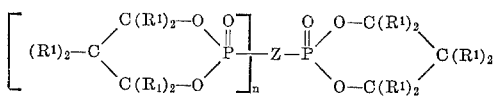

wherein $R^1$, Z and $n$ are as defined above. When a stoichiometric or excess amount of the Arbuzov reagent is utilized, a composition is formed comprising a mixture in which cyclic and non-cyclic phosphonates predominate having the formulae:

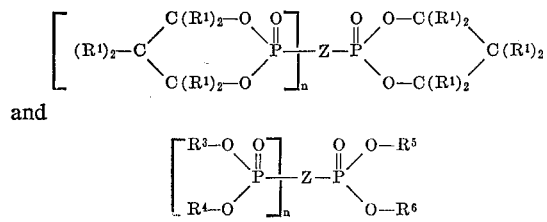

and wherein $R^1$, $R^3$, $R^4$, $R^5$, $R^6$, Z and $n$ are as defined above. These phosphonates form from 45 to 100 percent of the mixture. An alkyl diaryl phosphite or a dialkyl aryl phosphite may be reacted with an excess of one mole, but less than two moles of a polyhydric compound, as defined above, and form a phosphite composition of cyclic and non-cyclic phosphites. The phosphite composition, when rearranged with a catalytic amount of an Arbuzov reagent, will form as a composition mixture of cyclic and non-cyclic phosphonates having the structural formulae:

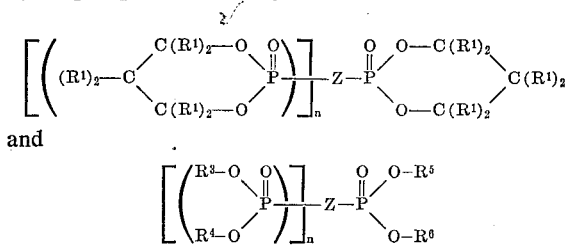

and wherein $R^1$, $R^3$, $R^4$, $R^5$, $R^6$, Z and $n$ are as defined above and the cyclic phosphonates contain from 1 to 32 hydroxyls and the non-cyclic phosphonates contain from 3 to 32 hydroxyls. The starting alkyl diaryl phosphite or the dialkyl aryl phosphite may be employed as such, or prepared by the transesterification of a triaryl phosphite and aliphatic alcohol in situ. An aliphatic alcohol in excess of a stoichiometric amount may be utilized in this procedure and separated upon completion of the reaction. It has been surprisingly found that when preparing the alkyl diaryl and aryl dialkyl phosphites in situ that the excess aliphatic alcohol facilitates the reaction. A mixture of phosphonates having the formulae:

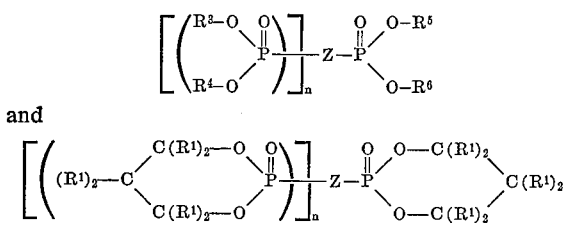

and are formed by reacting a triorgano phosphite with an excess of 2 moles, but less than 3 moles of a polyhydric compound, as defined above. An intermediate mixture of linear and cyclic phosphites is formed that is rearranged by reacting with a catalytic amount of an Arbuzov reagent. It is to be understood that in each instance where the intermediate mixture of phosphites is prepared, they may be isolated as such, or rearranged to form the corresponding phosphonate mixture. Further, if a stoichiometric, or excess amount of Arbuzov reagent is utilized (from 25 to 200 percent in excess of the stoichiometric amount, preferably from 25 to 100 percent in excess of the stoichiometric amount), a mixture of bicyclic, cyclic and/or non-cyclic phosphites is produced as in intermediate, in the present process. Where a triorganic phosphite is reacted with an excess of two moles of the polyhydric compound, the product that predominates (from 50 to 100 percent) is a non-cyclic phosphonate. This latter process is evident from the teachings herein. It is desired, however, to maintain a mixture of cyclic and non-cyclic phosphonates, as such products surprisingly possess desirable hydroxyl numbers.

In instances where the alkyl diaryl phosphite and dialkyl aryl phosphite is prepared in situ in the presence of an excess amount of an aliphatic alcohol, it is believed that the excess alcohol acts as a solvent, thus, facilitating the reaction. In such procedures, best results are obtained when utilizing an aliphatic alcohol having from 1 to 70 carbon atoms. The preferred aliphatic alcohol, however, has been found to contain from 3 to 22 carbon atoms, with the most favorable results being achieved when the aliphatic alcohol contains from 3 to 18 carbon atoms.

The triorganic phosphites, which may be utilized in the practice of this invention, are either simple or mixed phosphites. Examples of useful phosphites are trimethyl, triethyl, tri-n-butyl, tri-n-octyl, tri-nonyl, triundecyl, amyl diethyl, butyl di-n-propyl, n-dodecyl dimethyl, ethyl octyl propyl, tris (2-chloroethyl), tri(3-chloropropyl), tris (3,4-dichlorobutyl) tris (2-bromoethyl), tris (3-iodopropyl, tris (2-fluoroethyl), tris (dichlorododecyl), 2-chloroethyl diethyl, 3-bromopropyl bis (2-chloroethyl), diamyl trichlorooctyl, 2-chloroethyl - 3-chloropropyl-4-chlorobutyl, triphenyl, tricresyl, dicresyl butyl, trixylenyl, dicresyl butyl, di(2,4-xylenyl) butyl, dicresyl hexyl, dicresyl octadecyl, diphenyl butyl, diphenyl stearyl, dibutyl-2,4-xylenyl, tris (2-chlorophenyl), tris (2,6-dibromophenyl), tris (3-bromophenyl), tris (2-ethylphenyl), tris (2-cyclohexylphenyl), tris (4-octylphenyl), tris (4-butylphenyl), tris (2-nitrophenyl), tris (2-methoxyphenyl), tris (alpha-naphthyl), tris (beta naphthyl), and so forth.

The polyhydric compounds of this invention are those which will tend to form a cyclic dioxaphosphorinane ring structure. Thus, polyhydric compounds having one carbon atom between two carbon atoms having a hydroxyl attached thereto are appropriate. Examples of polyhydric compounds are:

2,5-bishydroxymethyl-hexanediol-(1,6)
2,5-dinitro-2,5-bishydroxymethyl-hexanediol-(1,6)
2,6-dinitro-2,6-bishydroxymethyl-heptanediol-(1,7)
2,7-dinitro-2,7-bishydroxymethyl-octanediol-(1,8)
2-methylol-2-nitro-propanediol-(1,3)
4-methyl-2-methylol-pentanediol-(1,3)
2-nitro-4-methyl-2-methylol-pentanediol-(1,3)
2-nitro-2-hydroxymethyl-butanediol-(1,4)
2-nitro-2-hydroxymethyl-pentanediol-(1,3)
2-nitro-2-hydroxymethyl-hexanediol-(1,3)
trimethylol isobutane
2-nitro-5-methyly-2-hydroxymethyl-hexanediol-(1,3)
annhydroennea-heptitol
1,1,1,3,3,3-hexamethylol-propanol-2
2,2,6,6-tetramethylol cyclohexanol-1
2,2,5,5-tetramethylol-cyclopentanol-1
beta,beta'-dihydroxy-t-butyl benzyl alcohol
2-hydroxymethyl-butanetriol-1,2
pentaerythritol monomethylether
pentaerythritol
dipentaerythritol
triphentaerythritol
trimethylol propane and other trimethylolalkanes, e.g., trimethylol ethane, trimethylol butane, trimethylol octadecane and trimethylol decane. Although polyhydric compounds containing from 2 to about 33 hydroxyls may be employed in the practice of this invention, polyhydric compounds having from 2 to 12 hydroxyls are preferred, with those polyhydric compounds containing from 2 to 8 hydroxyls being most favored.

With respect to the novel mixture of cyclic and non-cyclic phosphonates of the invention typical individual radicals that are illustrative but not limiting for $R^1$, $R^3$, $R^4$, $R^5$, $R^6$, $R^7$ and Z are as follows:

Alkyl

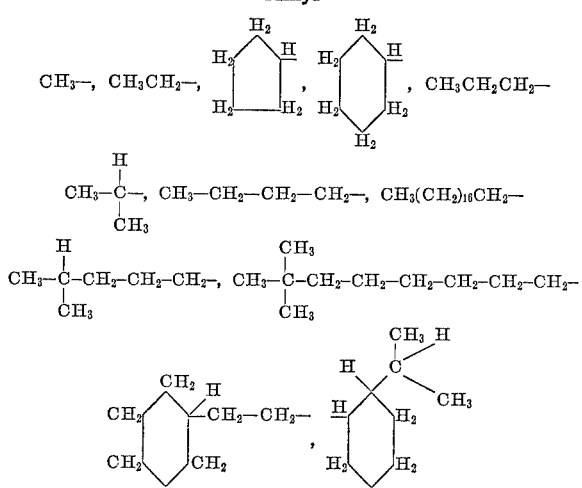

Therefore, alkyls and cycloalkyls, as set forth throughout this description, having from 1 to 70 carbons, may be utilized, but those having from 3 to 18 carbons being the most favored.

Aryl

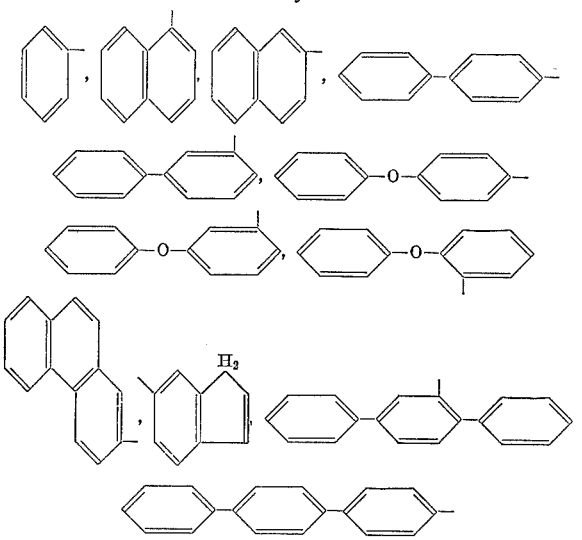

Therefore, aryls, as set forth throughout this description, having from 6 to 70 carbons being preferred, but those having from 6 to 18 carbons being the most preferred.

Halo-substituted aryl

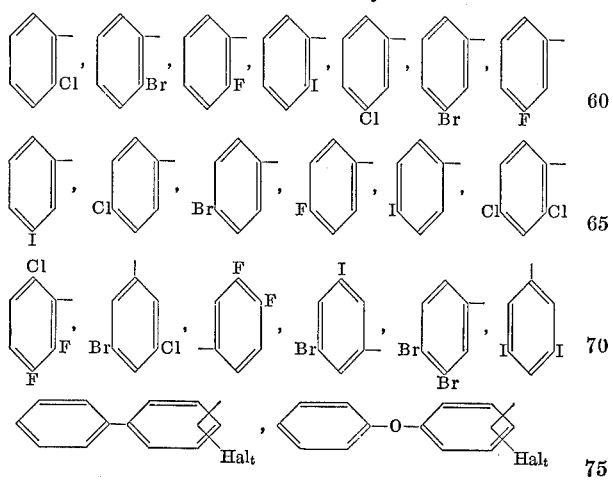

Hal is selected from Cl, Br, I, and F; and $t$ is an integer from 1 to four,

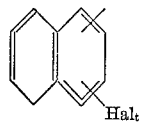

Hal is selected from Cl, Br, I, and F; and $t$ is an integer from 1 to four,

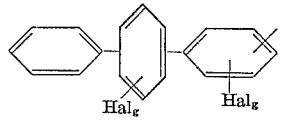

Hal is selected from Cl, Br, I, and F; and the sum of $g$ is an integer from 1 to seven, Alkyl-substituted aryl

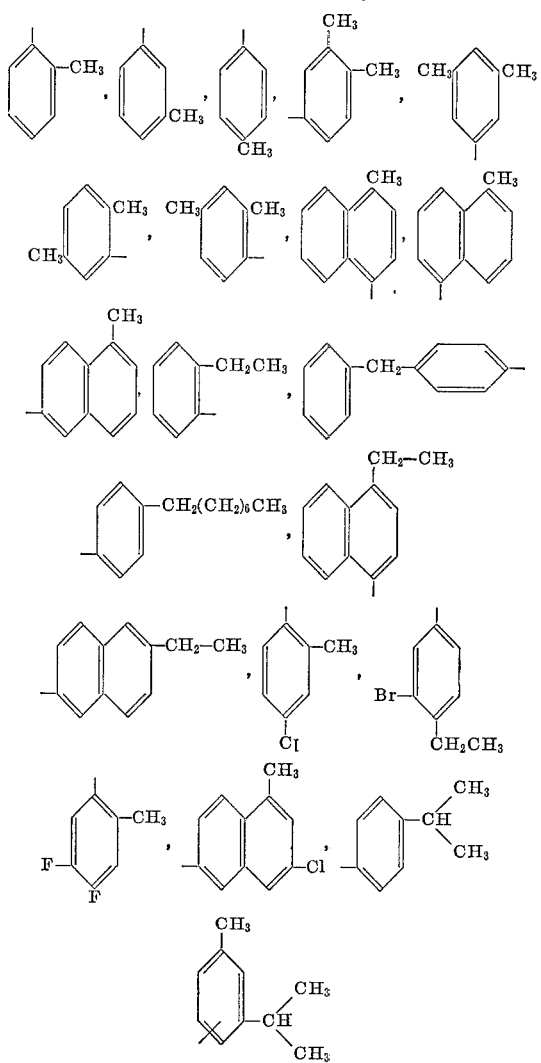

Aryl-substituted alkyl

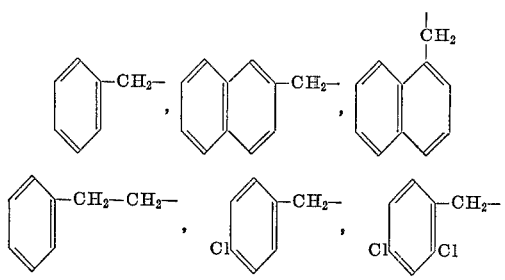

Aryl-substituted alkyl—Continued

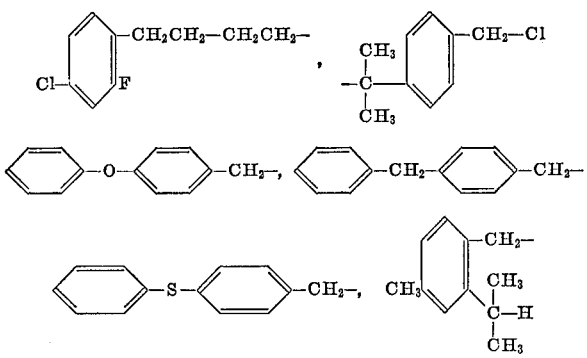

Hydroxy alkyl

−CH₂OH, −CH₂CH₂−OH, −CH₂−CH₂−CH₂−OH

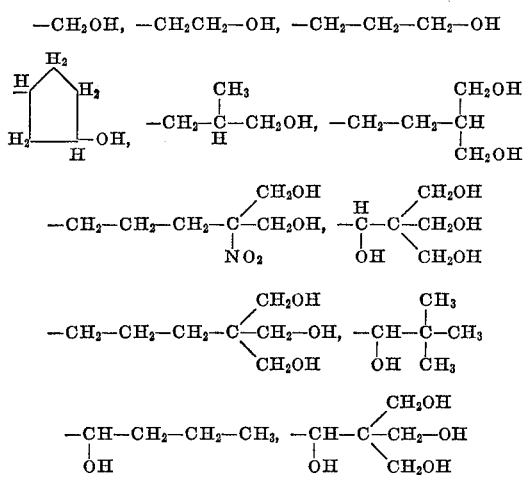

Hydroxy alkoxy alkyl

−CH₂−OCH₂OH, −CH₂−OCH₂CH₂OH, −CH₂−OCH₂CH₂OCH₂CH₂OH

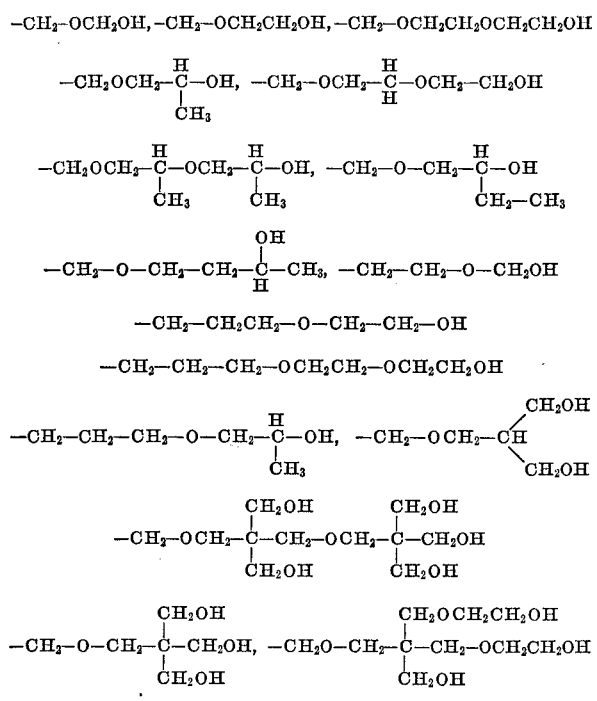

Alkylene

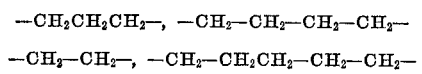

−CH₂−CH₂−, −CH₂−CH₂CH₂−CH₂−CH₂−

Substituted alkylene

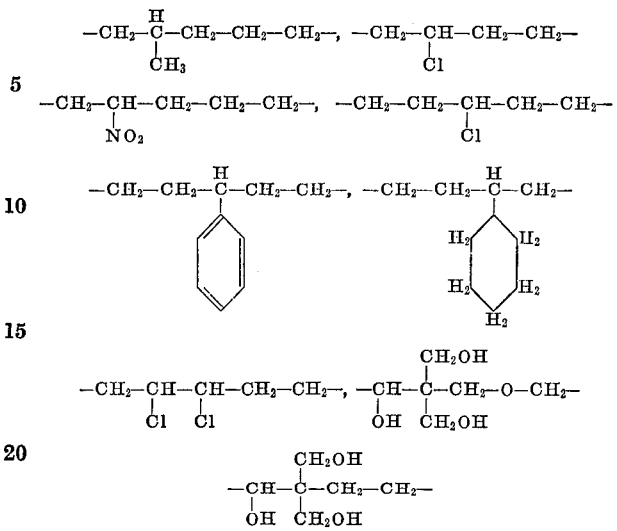

Alkoxyalkyl

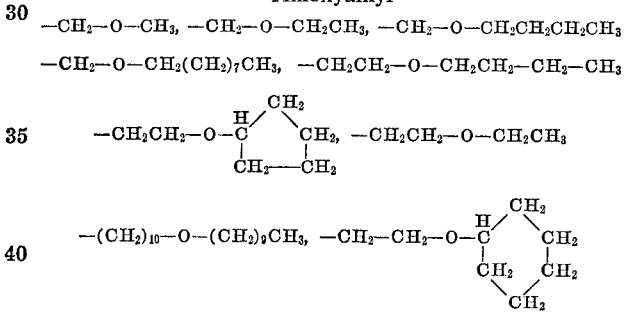

Alkene

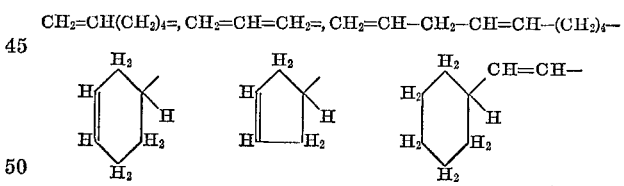

The transesterification of a triorgano phosphite with a polyhydric compound may be carried out in the absence of a transesterification catalyst. However, utilization of catalyst increases the rate of reaction. Examples of transesterification catalysts are: metal alcoholate, phenolate or hydride, such as sodium methylate, lithium methylate, potassium methylate, sodium ethylate, sodium isopropylate, sodium phenolate, potassium phenolate, sodium cresylate, sodium hydride, sodium metal, lithium metal and so forth; sodium hydroxide and diesters of phosphorous acid may, also, be utilized. It is, thus, evident that often a basic transesterification catalyst is to be utilized. This catalyst may have a pH of at least 7.5 in a 0.1 normal solution of the polyhydric compound to be utilized in the reaction. Other basic catalysts, which may be utilized, are diethyl aniline, quinoline, monododecyl, monomethyl amine, didodecyl methyl amine, pyridine, and so forth.

Arbuzov reagents are utilized in the practice of this invention in a catalytic amount, to catalyze the rearrangement of the phosphite to the phosphonate, stoichiometric, or in an amount in excess of the stoichiometric amount, to open up a bicyclic phosphite to form a cyclic phosphonate. When the bicyclic phosphite is to be opened, an excess of from 25 to 75 percent of the stoichiometric amount of Arbuzov reagent is required, with best results being achieved when the excessive amount of Arbuzov reagent added is equal to an excess of from 35 to 65 percent of the polyhydric compound added. The cyclic phosphites may, also, be opened up and rearranged, in a similar manner.

Arbuzov reagents which may be utilized in the practice of this invention are alkyl halides, alkenyl halides, alkyl substituted alkenyls, cycloalkyl halides containing from about 1 to about 70 carbon atoms with the preferred reagents having from 1 to about 22 carbon atoms, and the most preferred having from 1 to about 12 carbon atoms. Examples of these reagents are methyl iodide, butyl chloride, butyl iodide, pentyl fluoride, pentyl bromide, hexyl chloride, nonyl bromide, octyl iodide, decyl bromide, isodecyl bromide, undecyl fluoride, stearyl chloride, 1,2-dibromomethane, 1,3-dichloropropane, 1,2-dibromoethyl ether, 1,4-dichloro-2-ethoxybutane, allyl chloride, methallyl chloride, chloropropylene, 3-heptene, chlorobutylene, bromopropylene, iodopropylene, chloromethylacetylene, bromomethylacetylene, dichlorododecylene, dibromo octadecylene, chlorobromopentene, ethylene chlorobromide, oxatane dibromide, 1,2-propylene chloride, trimethylene chloride, amylene dibromide, 3,3-bisiodomethyloxatane, 1,4-chloromethyl benzene, carbon tetrachloride, dichlorodibromomethane, acetylene tetrabromide, trichloroethylene, fluorochlorobromomethane, methyl chloroform, hexachloroethane, heptachloropropane, perbromoethylene, chlorocyclopropane, dibromocyclopropane, dichlorocyclopropane, bromocyclobutane, bromocyclopentene, 2-chloroethyl bromocyclooctane, chlorocycloheptane, 2-chlorocyclopentene, 2-iodo-1,3-cyclohexadiene, 7,7-dichloronorcarene, 7,7-dibromonorcarene, 1-chloro-1,3-dimethycyclohexane, bromodecalin, chlorodecalin, bromocyclotetradecane,1-iodo-1-methycyclopentane, isomers of the above, and so forth. The cycloalkyls containing about 3 to 13 carbon atoms being preferred and the most preferred cycloalkyls containing between about 3 to 7 carbon atoms. Examples of aralkyl halides and dihalides having from 6 to 70 carbon atoms, with the preferred aralkyls having from 6 to about 24 carbon atoms, that may be utilized as an Arbuzov reagent in the practice of this invention are diphenylbromomethane, triphenylbromomethane, benzyl chloride, benzal chloride, benzotrichloride, chloromethylnaphthalene, 1-phenyl-1-chloroethane, bromomethylnaphthalene, chloromethylanthracene, bromomethylanthracene, 1-phenyl-2-chloroethane, benzyl bromide, 1-phenyl-2-bromoethane, 1-phenyl-2-chloropropane, bis-chloromethylnaphthalene, chloromethylpolystyrene, bromomethyltoluene, bromomethylxylene, dichlorobromethylbenzene chloromethylanisole, bisbromomethylanisole, and so forth. The ease of reaction varies with the nature of the halogen atom in the reagent. The decreasing order of activity is iodide, bromide, chloride and fluoride.

The above Arbuzov reagents are merely illustrative and not to be considered as limiting the invention disclosed herein. It will be clear to those skilled in the art that the Arbuzov reaction of catalytic isomerization may, also be effected by compounds selected from the group consisting of acyl halides, heteroalkyl halides, alphahaloketones, alpha-haloamides, alpha-halonitrite, chlorocarbamates, beta-haloesters, epichlorohydrin, epibromohydrin, and so forth.

Examples of other catalysts which may be utilized to cause an Arbuzov rearrangement are alkali metal halides, such as, sodium iodide, potassium fluoride, sodium bromide, lithium iodide, cesium iodide, and so forth. Isomerization (Arbuzov rearrangement) may, also, be induced by various other reagents, such as, metyhl sulfate, cuprous chloride, cuprous iodide, iodine or even by thermal means alone.

The reactions of this invention may be carried out at temperatures of from 25 to about 300 degrees centigrade. Temperatures of from about 75 to about 200 degrees centigrade may, also, be employed, with most reactions being carried on at temperatures from 135 to about 200 degrees centigrade. It has been further found that by heating the transesterification mixture from 175 to about 300 degrees centigrade, the volatile by-products may be removed and rearrangement of the phosphite to phosphonate may be achieved. The reaction, therefore, may be conducted in situ without the removal of by-products until the desired phosphonate mixture is obtained.

Known means of determining the completion of reaction may be utilized. For purposes of illustration, a titer of the phosphite present during the rearrangement of the phosphite may be utilized. When a negligible titer is obtained, less than 0.3 percent of the original titer, the reaction is deemed complete.

The Arbuzov reagents, generally, utilized in the practice of this invention have the formula, $R^8Xa$; wherein $R^8$ is alkyl, alkylene, alkenyl, aryl, aralkyl, substituted aryl, substituted alkyl, substituted akylene, substituted alkenyl, hydroxy aryl, hydroxy alkyl, alkoxy alkyl, hydroxy alkoxy alkyl; X is selected from the group consisting of iodine, bromine and chlorine; and $a$ is from 1 to 5.

The products formed by following the teachings of this invention may be polymers, wherein the polymer contains between 2 and 20 phosphorus atoms.

It has been found that the formation of cyclic and noncyclic phosphonates are favored when utilizing an alkyl diaryl-, or aryl dialkyl phosphite, e.g., butyl diphenyl phosphite, butyl dicresyl phosphite, and so forth, and the alkyl group may have from 3 to 70 carbon atoms.

The novel phosphonate mixture of the present invention may be utilized in the range of from about 0.2 to about 95 percent of the polyol component contained in a urethane foam system; however, the preferred range is from 5 to about 50 percent, with best results for flame-retarding being obtained when from 10 to 30 percent of the polyol component contained in the urethane foam system is the novel mixture of esters of phosphonic acid of the present invention. The urethane foam system described include the weight of the blowing agent, catalyst, and surfactant.

In the preparation of the polyurethane compositions containing the novel mixtures of esters of phosphonic acid disclosed in this invention, it is preferred to use a hydroxyl-containing polymeric material having an hydroxyl number from about 25 to about 900. Such a polymeric material can be a polyester, a polyether or mixtures thereof. Particularly suitable are mixtures of a polyester and a polyether, wherein the polyester portion comprises at least 25 percent of the mixture. Excellent results are obtainable when less than 25 percent polyester is employed, but supplementary additives may be required to render such a foam self-extinguishing. It is especially preferred in the present invention to use a mixture of polyester and polyether in the ratio of 25 to 75 parts polyester to 75 to 25 parts of polyether. Generally, the hydroxyl-containing polymers have a molecular weight in the range from 200 to about 4,000.

The polyol phosphonate may be blended by means known to the art with the other components of a urethane foam system at temperatures ranging from 0 to about 150 degrees centigrade, although, usually temperatures of from 25 to 50 degrees centigrade are utilized.

In addition to the polyurethane the phosphonates of this invention may be utilized as flame-retarding additives or reactants in other plastic systems, such as the polyesters, polyacrylates, polymethacrylates, polyepoxides, polyvinylchlorides, phenylaldehyde polymers, polyamides, and so forth.

The following examples illustrate the invention, but do not limit it. All parts are by weight, temperatures are in degrees centigrade and moles are in gram, moles, unless otherwise stated.

EXAMPLE 1

Triphenyl phosphite (5 gram moles, 1550 grams), iso-butanol (5.5 gram moles, 408 grams), sodium hydride (1.8 grams) were charged to a reaction vessel and heated to a temperature of about 130 degrees centigrade. This reaction mixture was heated at this temperature for about two hours to effect a transesterification of the triphenyl phosphite and isobutanol. Trimethylol propane (6.25 moles, 838.6 grams) was then added to the mixture and the mixture heated to about 130 degrees centigrade for a period of two hours, butylbromide (0.5 mole, 68.5 grams) was then added to this reaction mixture and the temperature in the reaction vessel raised to about 150 degrees centigrade. The temperature was maintained at between about 150 degrees centigrade and 165 degrees centigrade until a negligible iodine titer was obtained, about 22 hours. A yellowish viscous liquid was obtained after distillation of the volatile at about 100 degrees centigrade under a vacuum of 10 to 50 millimeters of mercury absolute. A mixture of phosphonates having the following structures present was obtained:

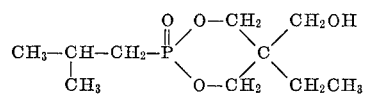

Trimethylolpropane isobutane phosphonate, and

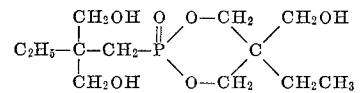

Trimethylolpropane (trimethylolpropane) phosphonate

Infra-red analysis of the product confirmed the presence of the products set forth.

EXAMPLE 2

Triphenyl phosphite (10 moles, 3100 grams), butanol (22 moles, 1628 grams), sodium hydride (6 grams) were charged to a reaction vessel and heated for a period of about two and one-half hours at a temperature of about 135 degrees centigrade. After this period of time, trimethylolpropane (15 moles, 2015 grams), phenol (2015 grams) a solvent, and sodium hydride (6 grams) were added to the reaction vessel and heated for about 2 hours to effect further transesterification. The mixture was then rearranged (isomerized) by adding butylbromide (400 grams) and refluxing at a temperature from 105 degrees centigrade to 114 degrees centigrade (pot temperatures from about 162 degrees centigrade to about 165 degrees centigrade) for a period of twenty-six hours. A negligible iodine titer was obtained indicating the absence of phosphites. The volatiles were distilled in accordane with Example 1. The product, a mixture of phosphonates, having the following structure was obtained:

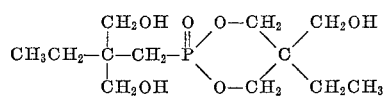

Trimethylolpropane(trimethylolpropane) phosphonate
and

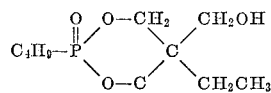

Trimethylolpropane butane phosphonate

Infra-red analysis of part of the product strongly indicated the presence of a phosphonyl group and functional hydroxyls. Part of the residue (2416 grams) was submitted to epichlorohydrin (6000 milliliters) treatment to remove any P—OH entity produced by the reaction. This blanking treatment consisted of heating the above residue and epichlorohydrin for four hours at a temperature of from about 120 degrees centigrade to about 122 degrees centigrade. After blanking, analysis of the product was as follows:

Acid number _____ 1.8
Hydroxyl number _____ 488
Percent chlorine _____ 3.3
Increase in weight of product after blanking, percent _____ 9.2
Phosphorus analysis, found, percent _____ 9.70
Viscosity at 50° C. in Gardner seconds _____ 35

EXAMPLE 3

Triphenyl phosphite (10 moles, 3,100 grams), n-butyl alcohol (22 moles, 1,628 grams) and sodium hydride (6 grams) were charged to a reaction vessel and transesterified two and one-half hours at a temperature of about 135 degrees centigrade. After this period of time, trimethylolpropane (12.5 moles, 1,680 grams), phenol (1,675 grams), solvent, and sodium hydride (6 grams) were added to the reaction mixture which was then refluxed at 135 degrees centigrade for two and one-half hours to assure transesterification and to dissolve the solvent phenol. Then butyl bromide (100 grams) was added and the reaction mixture heated to a temperature of from about 155 degrees centigrade to 160 degrees centigrade. A negative iodine titer was obtained after about 73 hours of heating the mixture at this temperature. The volatiles were separated following the procedure of Example 1. The residue was a mixture of cyclic and non-cyclic phosphonates having the structural formulae:

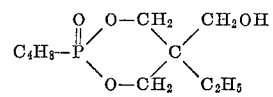

Trimethylolpropane butane phosphonate

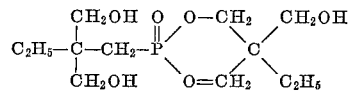

Trimethylolpropane (trimethylolpropane) phosphonate

Bis-(trimethylolpropane) butane phosphonate and

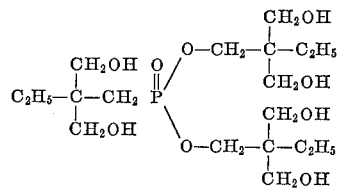

Bis-trimethylolpropane (trimethylolpropane) phosphonate

Infra-red analysis of the product indicated the above structures were present. Analysis of the product gave the following data:

Acid number _____ 21.6
Phosphorus analysis, found, percent _____ 10.8
Viscosity at 50° C. in Gardner seconds _____ 9.5

The phosphonate was then neutralized with propylene oxide. Part of the residue phosphonate (100 grams) was added to about 300 milliliters of propylene oxide and this mixture heated to a temperature of about 120 degrees centigrade for a period of four hours. The phosphonate residue was then reweighed, after removal and drying of the propylene oxide, an dan increase of approximately 20 percent in weight of the phosphonate was recorded. The phosphonate was again submitted to infra-red analysis and this analysis supported the above structures.

EXAMPLE 4

Example 3 was repeated, utilizing epichlorohydrin; however, the product formed was blanked with epibromohydrin, as described in Example 2. Analysis of the product gave the following data:

Acid number _____ 4.7
Hydroxyl number _____ 550
Percent bromine _____ 1.7
Phosphorus analysis, found, percent _____ 11.1
Increase in weight of product after blanking, percent _____ 6

EXAMPLE 5

Triphenyl phosphite (10 moles, 3,100 grams), ethanol (20 moles, 926 grams), and sodium hydride (6 grams) were charged to a reaction vessel and heated for about two and one-half hours at about 135 degrees centigrade. Trimethylolpropane (12.5 moles, 1,680 grams), phenol (1,675 grams), solvent and sodium hydride (6 grams) were then added to the reaction mixture, which was refluxed at about 135 degrees centigrade for two and one-half hours. Ethyl iodide (200 grams) was added to the mixture and the reactants isomerized at 135 degrees centigrade for 32 hours. The volatiles were removed as in Example 1.

A viscous, yellow liquid was obtained containing a mixture of phosphonates having the structures:

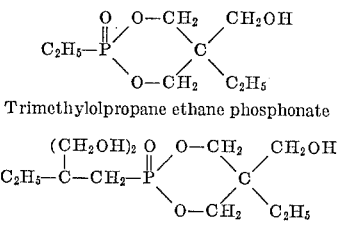

Trimethylolpropane ethane phosphonate

Trimethylolpropane (trimethylolpropane) phosphonate

A sample of the residue was submitted for infra-red analysis. This analysis indicated the presence of the above structures.

Hydroxyl number of the product was: Calculated, 548. Found, 515.

EXAMPLE 6

Triphenyl phosphite (12 moles, 3,720 grams), isopropanol (13.2 moles, 793 grams) and sodium hydride (4.5 grams) were charged to a reaction vessel and heated at a temperature of about 145 degrees centigrade for about two hours. Trimethylolpropane (15 moles, 2,013 grams) was then added to the reaction mixture and the mixture heated at about 140 degrees centigrade for a period of about two hours to effect transesterification. Epichlorohydrin (222 grams) was then added to the reaction vessel, which was heated for about 26 hours (until a negligible iodine titer was obtained). The by-products were stripped in accordance with Example 1. The product, which was viscous, had a yellowish appearance and was a mixture of phosphonates, trimethylolpropane isopropane phosphonate and trimethylolpropane phosphonate. A sample of the product was analysed by infra-red analysis and the evidence obtained confirmed the presence of the products.

The mixture of phosphonates (544.5 grams) and propylene oxide (55 grams) were then charged to a reaction vessel and heated under reflux conditions at 120 degrees centigrade for two hours. Volatiles were stripped in accordance with Example 1 and the product weighed. There was an increase of two percent in the weight of the residue after this treatment.

Analysis for hydroxyl number was: Calculated, 780. Found, 542.

EXAMPLE 7

Example 6 was repeated, however, an excess ethylene oxide was utilized to remove the secondary phosphite present in the reaction mixture. There was a slight increase in the weight of the phosphonate over the initial weight.

Analysis for hydroxyl number was: Calculated, 812. Found, 580.

EXAMPLE 8

Triphenyl phosphite (2.5 moles, 775 grams), butanol (5 moles, 370 grams), and sodium hydride (1 gram) were charged to a reaction vessel and heated to a temperature of about 135 degrees centigrade for two and one-half hours. After this period of time, trimethylolethane (3.1 moles, 375 grams) was added and the mixture further transesterified at 135 degrees centigrade for two and one-half hours using an additional 1 gram of sodium hydride to catalyze transesterification. To this reaction mixture 2-chloroethanol (2.75 moles, 225 grams) was added and the reaction mixture isomerized for about twenty-six hours at reflux temperatures (pot temperatures of 155 degrees centigrade to 160 degrees centigrade and head temperatures of from about 90 degrees centigrade to 117 degrees centigrade) until a negligible iodine titer as obtained. The volatiles were then stripped in accordance with Example 1. The product had a mixture of phosphonate having the structural formulae:

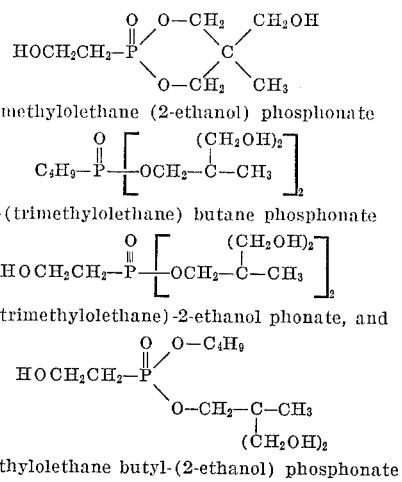

Trimethylolethane (2-ethanol) phosphonate

Bis-(trimethylolethane) butane phosphonate

Bis-(trimethylolethane)-2-ethanol phonate, and

Trimethylolethane butyl-(2-ethanol) phosphonate

A sample was submitted for infra-red analysis. The results indicated the presence of these structures.

EXAMPLE 9

Trimethyl phosphite (10 moles, 1,240 grams), isopropanol (10 moles, 601 grams) and sodium hydride (3 grams) were charged to a reaction vessel and transesterified at about 135 degrees centigrade for a period of one hour. At the end of this period of time, trimethylolpropane (12.5 moles, 1,680 grams) was added to the reaction mixture and the mixture further transesterified for a period of two hours at 135 degrees centigrade. Volatiles were then stripped from the reaction mixture by imposing a vacuum of 400 millimeters of mercury on the systems. Epichlorohydrin (2 moles, 185 grams) was added to the reaction mixture, which was heated for thirty-eight hours at a temperature of about 130 degrees centigrade. Butyl bromide (28 grams) was added to the reaction mixture and the mixture heated at about 125 degrees centigrade for seven hours. The product obtained was a mixture of trimethylolpropane isopropane phosphonate and and trimethylolpropane phosphonate. A sample of the product was subjected to infra-red analysis, the results of which confirmed the presence of a phosphonate.

Analysis of the blanked product gave the following data:

Acid number _____ Nil
Hydroxyl number _____ 318
Percent chlorine _____ 1.6
Phosphorus analysis, found, percent _____ 13.3

EXAMPLE 10

Example No. 9 was repeated substituting butyl alcohol (10 moles) for isopropyl alcohol. A product obtained was a mixture of trimethylolpropane butane phosphonate and trimethylolpropane phosphonate. A sample of the residue was submitted to infra-red analysis. This analysis indicated the presence of the phosphonates set forth above.

After a blanking of the product, as in Example 1, analysis gave the following data:

Acid number _____ Nil
Hydroxyl number _____ 326
Percent chlorine _____ 1.4
Phosphorus analysis, found, percent _____ 13.1

EXAMPLE 11

Triphenyl phosphite (24 moles, 7,440 grams), isopropanol (26.4 moles, 1,586 grams), and sodium hydride (9 grams) were charged to a reaction vessel and esterified at a temperature of about 135 degrees centigrade for a period of one hour. After this time, trimethylolpropane (30 moles, 4,025 grams) was added to the reaction mixture, which was heated at a temperature of about 135 degrees centigrade for a period of about two hours. Epichlorohydrin (660 grams) was then added to the reaction mixture and the mixture isomerized at a temperature of about 140 degrees centigrade until a negligible iodine titer was obtained. The negligible iodine titer was obtained after about thirty-one hours. Volatiles were removed from the reaction mixture as set forth in Example 1. Seventy (70) grams of the product were then mixed with about 300 millimeters of epichlorohydrin and this mixture was heated to about 125 degrees centigrade for a period of about two hours. The epichlorohydrin was then stripped from reaction mixture utilizing a vacuum of about 15 millimeters of mercury absolute.

A yield of product with structures similar to those obtained in Example 9 were recovered in about 87.2% yield, based on triphenyl phosphite.

EXAMPLE 12

Triphenyl phosphite (5 moles, 1,550 grams), isopropanol (5.5 moles, 330 grams), and sodium hydride (1.8 grams) were charged to a reaction vessel and heated at a temperature of approximately 140 degrees centigrade for a period of one hour. Trimethylolpropane (6.25 moles, 839 grams) and phenol (839 grams) were then added to the reaction mixture, which was heated for a period of two hours at about 142 degrees centigrade to further effect transesterification. Tri(beta-chloropropyl phosphite was then added in a catalytic amount to the reaction mixture to effect isomerization. The volatiles were stripped, as in accordance with Example 1. A sample of the product was submitted to infra-red analysis, which indicated the presence of the following phosphonates:

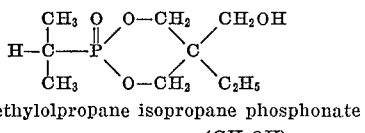

Trimethylolpropane isopropane phosphonate

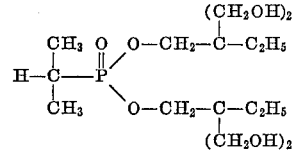

Bis-trimethylolpropane isopropane phosphonate, and

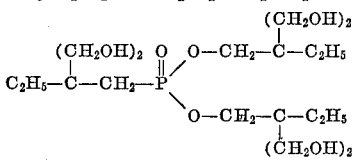

Bis-trimethylolpropane (trimethylolpropane) phosphonate

This example shows utilization of a phosphite as a catalyst for Arbuzov rearrangement.

After a blanking of the product, as in Example 1, analysis gave the following data:

Acid number _____ 8.2
Hydroxyl number _____ 455
Percent chlorine _____ 4.0
Increase in weight of product after blanking, percent _____ 10.0
Viscosity at 50° C. in Gardner seconds _____ 405

EXAMPLE 13

Triphenyl phosphite (5 moles, 1,550 grams), isobutanol (5.5 moles, 408 grams) and sodium hydride (1.8 grams) were charged to a reaction flask and transesterified at a temperature of 130 degrees centigrade for about two hours. After this period of time, trimethylolpropane (6.25 moles, 839 grams) was added and the reaction mixture transesterified at about 130 degrees centigrade for two hours. The mixture was then isomerized at reflux temperatures of from about 153 degrees centigrade to about 165 degrees centigrade for a period of 22 hours, utilizing butyl bromide (0.5 mole, 68.5 grams) as a catalyst. The product was a mixture of cyclic and non-cyclic phosphonates having the structures:

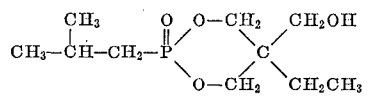

Trimethylolpropane isobutane phosphonate

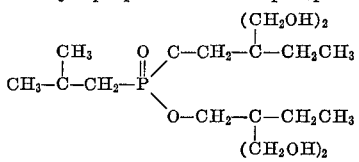

Bis-(trimethylolpropane) isobutane phosphonate, and

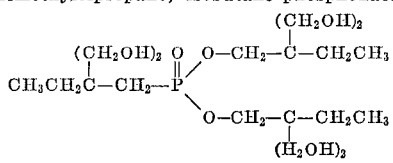

Bis-trimethylol (trimethylolpropane) phosphonate

A sample of the product residue was subjected to infra-red analysis. This analysis gave evidence that the above structures were present.

898 grams of the product were refluxed with 1,550 milliliters of epichlorohydrin for four hours at a temperature of about 123 degrees centigrade. The excess epichlorohydrin was then removed by filtration and the product reweighed. An increase in weight of the phosphonate of 12.2 percent was recorded. Analysis of this product gave the following data:

Acid number _____ Nil
Hydroxyl number _____ 467
Phosphorus analysis found, percent _____ 8.5
Increase in weight of product after blanking, percent _____ 10.9
Viscosity at 50° C. in Gardner seconds _____ 57

EXAMPLE 14

Triphenyl phosphite (10 moles, 3,100 grams), n-butanol (22 moles, 1,628 grams) and sodium hydride (6 grams) were charged to a reaction vessel and heated at a temperature of about 135 degrees centigrade for two and one-half hours. Phenol (1,675 grams) and trimethylolpropane (12.5 moles, 1,680 grams) were then added to the mixture and the mixture further transesterified at about 135 degrees centigrade for two and one-half hours. Butylbromide (100 grams) was then charged to the reaction mixture and the mixture heated at about 155 degrees centigrade until a negligible iodine titer was obtained.

A mixture of phosphonates was formed comprising trimethylolpropane butane phosphonate, trimethylolpropane phosphonate and bis-trimethylolpropane butane phosphonate.

Infra-red analysis confirmed the presence of the above structures. The product was recovered in 100 percent yield, based on triphenyl phosphite.

EXAMPLE 15

Triphenyl phosphite (10 moles, 3,100 grams), n-butanol (20 moles, 1,480 grams) and sodium hydride (6 grams) were charged to a reaction vessel and heated at 135 degrees centigrade for two and one-half hours. Phenol (1,675 grams), pentaerythritol (12.5 moles, 1,710 grams) and sodium hydride (6 grams) were then charged to the above reaction mixture and the mixture then further transesterified at 135 degrees centigrade for an additional two and one-half hours. The mixture was then isomerized (rearranged) at reflux temperatures (pot 153 degrees centigrade to 167 degrees centigrade/head, 130 degrees centigrade to 111 degrees centigrade) until a negligible iodine titer was obtained.

The product, a viscous liquid, yellowish in appearance was recovered in 92 percent yield, based on triphenyl phosphite.

The mixture of phosphonates had the following structures:

Pentaerythritol butane phosphonate

Pentaerythritol phosphonate, and

Bis-(pentaerythritol) butane phosphonate

Infra-red analysis indicated the presence of these structures.

EXAMPLE 16

Example 14 was repeated utilizing 15 moles (2,015 grams) of trimethylolpropane. A yield of 92.5 percent was recovered, based on triphenyl phosphite. A mixture similar to that of the product of Example 15 was obtained.

EXAMPLE 17

The teachings of Example 1 were followed, utilizing the following reactants. The product was the mixture indicated.

Reactants: Moles
Triphenyl phosphite _____ 1
Isobutanol _____ 1
Trimethylolpropane _____ 1.25
Epichlorohydrin _____ 2.0

Mixed product:

Bis-trimethylolpropane butane phosphonate

Bis-(trimethylolpropane) epichlorohydrin phosphonate

Trimethylolpropane isobutane phosphonate, and

Isobutyl chlorotrimethylolpropane - 2,3 - epoxy propyl phosphonate and oligomers polymers derived from condensation of the epoxy with adjacent hydroxyls.

It appears from infra-red analysis that a reaction, also, takes place when epoxy groups are present, wherein the epoxy group reacts with hydroxyls to form oligomers and polymers having up to about 10 phosphorus atoms.

In the following examples utilizing the reactants set forth and following the teachings of Examples 1 to 16, the products formed are indicated.

EXAMPLE 18

Reactants: Moles
Triphenyl phosphite _____ 1
Dipentaerythritol _____ 2.2
2,5-bischloromethyl furan _____ 1

Products in the mixture:
Dipentaerythritol (dipentaerythritol) phosphonate
Bis-(dipentaerythritol) dipentaerythritol phosphonate
Dipentaerythritol phosphonate
2,5-bis(methylchloride dipentaerythritol phosphonate)methyl furane phosphonate

EXAMPLE 19

Reactants:
Trinaphthyl phosphite _____mole__ 1
Hexyl alcohol _____moles__ 1.2
Sodium _____gram__ 1
2-nitro-2-hydroxymethylbutanediol-(1,3) _____ 2.3
Hexyl bromide _____mole__ 0.1

Products in the mixture:
2-nitro-2-hydroxymethyl-butanediol-(1,3) hexane phosphonate
2-nitro-2-hydroxymethyl-butanediol-(1,3)-(2-nitro-2-hydroxymethyl-butanediol-(1,3)) phosphonate
Bis-[2-nitro-2-hydroxymethyl-butanediol-(1,3)] hexane phosphonate

EXAMPLE 20

Reactants: Moles
Triphenyl phosphite _____ 1
1,1,1,3,3,3-hexamethylolpropanol-2 _____ 1
Sodium _____ 1.6
2,5-dichloromethyl benzene _____ 0.5

Products in the mixture:
1,1,1,3,3,3-hexamethylolpropanol-2-phosphonate
1,1,1,3,3,3-hexamethylolpropanol-2(1,1,1,3,3,3-hexamethylolpropanol)-2-phosphonate
2,5-bis-(1,1,1,3,3,3-hexamethylolpropanol-2-chloro) dimethyl benzene phosphonate

EXAMPLE 21

Reactants:
Triphenyl phosphite _____mole__ 1
2,2,5,5-tetramethylol-cyclopentanol-1 __moles__ 1.2
Sodium _____gram__ 1
Butyl iodide _____mole__ 0.1

Products in the mixture:
2,2,5,5-tetramethylol-cyclopentanol-1-phosphonate
2,2,5,5-tetramethylol-cyclopentanol-1-(2,2,5,5-tetramethylolcyclopentanol-1) phosphonate

TABLE I

| Example No. | Phosphonate mixture added | Density, pounds per cubic foot | Compressive yield, pounds per square inch | Underwriters Laboratory Test-484 | |
|---|---|---|---|---|---|
| | | | | Seconds | In. burned |
| 22 | Mixture of Example 10 | 2.59 | 37.6 | 57.2 | 1.4 |
| 23 | Mixture of Example 6 | 2.59 | 35.7 | 53.2 | 1.3 |
| 24 | Mixture of Example 2 | 2.64 | 55.9 | 59.0 | 1.6 |
| 25 | None | 2.23 | 30.9 | 152.0 | 6.0 |

2,5-bishydroxymethyl-hexanediol-(1,6)
2,5-dinitro-2,5-bishydroxymethyl-hexanediol-(1,6)
2,6-dinitro-2,6-bishydroxymethyl-heptanediol-(1,7)
2,7-dinitro-2,7-bishydroxymethyl-octanediol-(1,8)
2-methylol-2-nitro-propanediol-(1,3)
4-methyl-2-methylol-pentanediol-(1,3)
2-nitro-4-methyl-2-methylol-pentanediol-(1,3)
2-nitro-2-hydroxymethyl-butanediol-(1,4)
2-nitro-2-hydroxymethyl-pentanediol-(1,3)
2-nitro-2-hydroxymethyl-hexanediol-(1,3)
trimethylol isobutane
2-nitro-5-methyl-2-hydroxymethyl-hexanediol-(1,3)
annhydroennea-heptitol
1,1,1,3,3,3-hexamethylol-propanol-2
2,2,6,6-tetramethylol-cyclohexanol-1
2,2,5,5-tetramethylol-cyclopentanol-1
beta,beta'-dihydroxy-t-butyl benzyl alcohol
2-hydroxymethyl-butanetriol-1,2
pentaerythritol monomethylether
pentaerythritol
dipentaerythritol
tripentaerythritol
trimethylolpropane and other trimethylolalkanes, e.g., trimethylolethane, trimethylolbutane, trimethyloloctadecane and trimethyloldecane.

EXAMPLES 22 TO 25

Fine celled urethane foams were prepared in the following manner, incorporating therein the phosphonate mixtures of Examples 10, 6 and 2, as indicated:

Polyester

A polyester was prepared by the esterification of 10 moles (1340 parts) of trimethylolpropane with 6 moles (877 parts) of adipic acid by known techniques. The resin thus formed had a hydroxy number of about 500.

Mixture A

To 70 parts of the polyester adipate system described above, the following were added:

30 parts of the phosphonate mixture
28 parts of trichlorofluoromethane
0.5 part of a silicon surfactant, such as silicon X-520 (a surfactant made by Union Carbide Co.) and
0.8 part of trimethylbutanediamine.

These ingredients were then mixed to obtain a homogenous mixture.

Prepolymer

A prepolymer was prepared by the addition of 20 parts of the above-described polyester to 80 parts of toluene diisocyanate (commercial mixture of 80% 2,4-toluenediisocyanate, and 20% 2,6-toluenediisocyanate). This mixture was then heated for two hours at a temperature from about 80 degrees centigrade to 100 degrees centigrade.

Preparation of foam

Mixture A (126 parts) was added to 1,293 parts of the prepolymer. This was mixed at a temperature of about 25 degrees centigrade for 30 seconds and then poured to yield a fine celled rigid urethane foam. The foam was then analyzed and had the properties set forth in Table I.

EXAMPLE 26

The procedure set forth in Examples 22 to 25 for the preparation of fine celled urethane foams was repeated. However, 40 parts of the phosphonate mixture of Example 2, and 60 parts of the polyester adipate system prepared in accordance with Examples 22 to 25, were utilized in the preparation. The fine celled urethane foam prepared in this manner, showed improved fire resistance when tested by the American Standard for Testing Material, Test D-757-49. The foam had a value of 1.25 inches per minute. A fine celled urethane foam prepared in a similar manner, but without the phosphonate mixture present, had a value of 9.43 inches per minute.

From Examples 22–26, it is evident that the phosphonate mixtures of this invention will give fire retardance without adversely affecting the physical properties of the urethane foam.

EXAMPLE 27

Triphenyl phosphite (310 parts, 1 mole), isobutanol (82 parts, 1.1 moles) and sodium hydride (0.1 part) were charged to a reaction vessel. This mixture was stirred and heated at from 120 degrees centigrade to about 130 degrees centigrade for approximately one hour. An oxypropylated Novolak (532 parts, 1.25 moles) of structure approximating

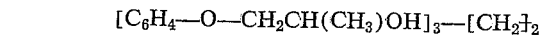

$[C_6H_4\text{—}O\text{—}CH_2CH(CH_3)OH]_3\text{—}[CH_2]_2$ having a molecular weight of 425 and a hydroxyl number of 396, was added, and the resulting mixture was stirred for approximately two hours at a temperature of from 130 degrees centigrade to about 140 degrees centigrade. A mixture of the resulting reaction mixture, containing phosphites, was isomerized by adding epichlorohydrin (93 parts, 1 mole), followed by heating and stirring at from 140 degrees centigrade to about 150 degrees centigrade for two hours. After this time, a negligible iodine titer was obtained. The volatiles, mainly, phenol and isobutanol, were vacuum stripped under ultimate conditions of about 160 degrees centigrade under .3 millimeter of mercury absolute.

Upon analysis, it was established that the product phosphonate, a viscous liquid, was obtained in a nearly theoretical yield. Further, an infrared analysis of the product confirmed the identity of this phosphonate product as oxypropylated Novolak isobutyl epichlorohydrin phosphonate, and oxypropylated Novolak isobutyl phosphonate.

Percent phosphorus analysis

*Phosphorus analysis.*—Found: 4.1. Calculated: 4.3. Hydroxyl No. 208.

While the invention has been set forth in the above description and examples, it should be realized that in its broadest aspects, the invention is not so limited. Many other modifications will become apparent to one skilled in the art upon a reading of this disclosure and these are also considered within the scope of this invention, as are equivalents which may be substituted therein.

What is claimed is:
1. A polyurethane foam composition comprising the reaction product of a polyol and an organic polyisocyanate in the presence of a foaming agent wherein a portion of the polyol is a mixture of at least two phosphonates selected from the group consisting of compounds of the formula

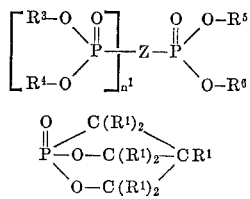

and

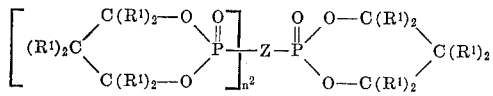

wherein $R^3$, $R^4$, $R^5$, $R^6$ and Z are members each selected from the group consisting of cycloalkyl; alkyl; substituted alkyl, in which the substituent is selected from the group consisting of aryl, nitro, hydroxy, cycloalkyl, hydroxyalkoxy, alkoxy, and halogen; alkene; alkylene; substituted alkylene in which the substituent is selected from the group consisting of alkyl, halogen, nitro, aryl, cycloalkyl, alkoxy and hydroxy; unsubstituted aryl; substituted aryl in which the substituent is selected from the group consisting of nitro, halogen, cycloalkyl, aryloxy, alkoxy, hydroxy, and alkyl; said alkyls and cycloalkyls, each being of from 1 to 70 carbon atoms, said aryls being of from 6 to 70 carbon atoms, said alkylenes being of from 1 to 70 carbon atoms; in which $R^1$ is selected from the group consisting of hydrogen and $R^3$; $n^1$ and $n^2$ each are from zero to 5; each cyclic and bicyclic phosphonate has from 1 to 32 hydroxyls; and in which each acyclic phosphonate has from 3 to 32 hydroxyls.

2. The composition of claim 1 wherein the mixture of phosphonates comprise from 0.2 to 95 percent of the polyol requirement of said polyurethane.

3. The polyurethane composition of claim 1 wherein the mixture of phosphonates comprises 5 to 50 percent of the polyol requirement.

4. The polyurethane composition of claim 1 wherein the mixture of phosphonates comprises from 10 to 30 percent of the polyol requirement.

5. The polyurethane composition of claim 2 wherein a portion of the polyol of said polyurethane is supplied by a hydroxyl containing polymer having a hydroxyl number of from about 25 to about 900.

6. The polyurethane composition of claim 1 wherein a portion of the polyol of said composition is supplied by a polyester.

7. The composition of claim 6 wherein said polyester is the reaction product of trimethylol propane and adipic acid.

8. The polyurethane composition of claim 1 wherein the mixture of phosphonates is comprised of the linear and the bicyclic phosphonates.

9. The polyurethane composition of claim 1 wherein the mixture of phosphonates is comprised of the linear and cyclic phosphonates.

10. The polyurethane composition of claim 1 wherein the mixture of phosphonates is comprised of the bicyclic and cyclic phosphonates.

11. The polyurethane composition of claim 1 wherein the mixture of phosphonates is compirsed of the linear, bicyclic and cyclic phosphonates.

12. The polyurethane composition of claim 1 wherein $R^1$ is hydrogen.

13. The polyurethane composition of claim 1 wherein $R^1$ is alkane.

14. The polyurethane composition of claim 1 wherein $R^1$ is a substituted alkyl wherein the substitutent is a hydroxyl group.

15. The polyurethane composition of claim 1 wherein the phosphonate is comprised of trimethylolalkane alkane phosphonate, and trimethylolalkane (trimethylolalkane) phosphonate.

16. The polyurethane composition of claim 1 wherein the phosphonate is comprised of trimethylolalkane (trimethylolalkane) phosphonate, and bis-(trimethylolalkane) trimethylolalkane phosphonate.

17. The polyurethane composition of claim 1 wherein the phosphonate is compirsed of trimethylolalkane alkane phosphonate; trimethylolalkane (trimethylolalkane) phosphonate; bis-(trimethylolalkane) alkane phosphonate; and, bis-(trimethylolalkane) trimethylolalkane phosphonate.

18. The polyurethane composition of claim 1 wherein the phosphonate is compirsed of trimethylolethane(2-ethanol) phosphonate; bis-(trimethylolethane) butane phosphonate; bis-(trimethylolethane) 2-ethanol phosphonate; and, trimethylolethane butyl (2-ethanol) phosphonate.

19. The polyurethane composition of claim 1 wherein the phosphonate is comprised of trimethylolalkane alkane phosphonate; bis-(trimethylolalkane) alkane phosphonate; and, bis-(trimethylolalkane) trimethylolalkane phosphonate.

20. The polyurethane composition of claim 1 wherein the phosphonate is comprised of pentaerythritol alkane phosphonate; pentaerythritol phosphonate; and, bis-(pentaerythritol) butane phosphonate.

References Cited

UNITED STATES PATENTS 3,382,301  5/1968  Hechenbleikner et al. _ 260—953

DONALD E. CZAJA, Primary Examiner

M. J. WELSH, Assistant Examiner

U.S. Cl. X.R.

260—22, 30.6, 75, 77.5